United States Patent [19]

Komurasaki

[11] Patent Number: 5,003,951
[45] Date of Patent: Apr. 2, 1991

[54] CONTROL APPARATUS FOR INTERNAL COMBUSTION ENGINE

[75] Inventor: Satosi Komurasaki, Himeji, Japan

[73] Assignee: Mitsubishi Denki Kabushiki Kaisha, Tokyo, Japan

[21] Appl. No.: 490,897

[22] Filed: Mar. 6, 1990

[30] Foreign Application Priority Data

Mar. 7, 1989 [JP] Japan .................. 1-52923

[51] Int. Cl.$^5$ .................. F02D 41/22; F02P 5/15
[52] U.S. Cl. .................. 123/425; 123/479; 364/431.11
[58] Field of Search .................. 123/425, 435, 479; 73/35; 364/431.08, 431.11

[56] References Cited

U.S. PATENT DOCUMENTS

| Re. 32,667 | 5/1988 | Staerzl | 123/425 X |
| 4,120,270 | 10/1978 | Asano et al. | 123/479 |
| 4,320,729 | 3/1982 | Sawada et al. | 123/479 X |
| 4,521,769 | 6/1985 | Dudeck et al. | 123/479 X |
| 4,541,386 | 9/1985 | Kishi et al. | 123/479 |
| 4,587,939 | 5/1986 | Hemminger et al. | 123/479 |
| 4,599,696 | 7/1986 | Takahashi | 123/479 X |
| 4,606,316 | 8/1986 | Komurasaki | 123/425 |

Primary Examiner—Tony M. Argenbright
Attorney, Agent, or Firm—Sughrue, Mion, Zinn, Macpeak & Seas

[57] ABSTRACT

A control apparatus for internal combustion engine which controls running of an internal combustion engine by use of a microcomputer, and which is provided with a signal processing circuit with a higher operating voltage than that of the microcomputer and a control circuit which invalidates an output of the signal processing circuit or lowers the control level in response to this output when the voltage of the signal processing circuit becomes to have a predetermined low value. Even if the voltage of the signal processing circuit becomes so low that a wrong signal should be outputted, there occurs no disadvantage in running control of the internal combustion engine.

4 Claims, 10 Drawing Sheets

→ TIME

→ TIME

CONTROL APPARATUS FOR INTERNAL COMBUSTION ENGINE

BACKGROUND OF THE INVENTION

1. Field of the Invention

The present invention relates to a control apparatus for internal combustion engine which controls fuel supply to an internal combustion engine and ignition timing and the like therein by a microcomputer.

2. Description of Related Art

Figure 1:
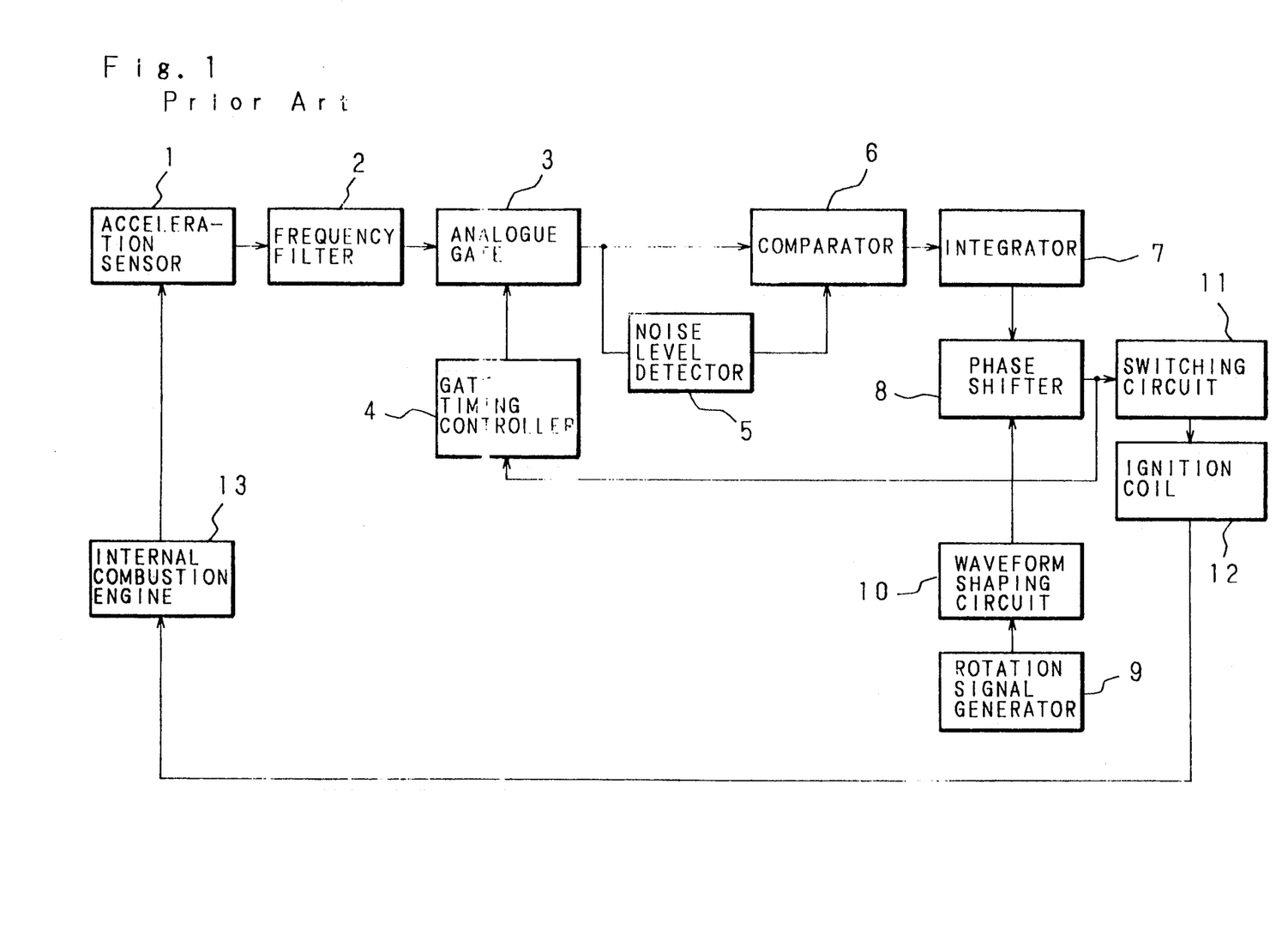
FIG. 1 is a block diagram showing an arrangement of a prior art ignition timing control apparatus.

FIG. 1 is a block diagram illustrating a prior art ignition timing control device which is provided with a knocking detection circuit for detecting knocking of an internal combustion engine. In the figure, reference numeral 1 designates an acceleration sensor which is mounted in an internal combustion engine 13 and which detects vibrational acceleration of the internal combustion engine 13. The acceleration sensor 1 is connected to a frequency filter 2 which passes an frequency element indigenous to knocking among output signals of the acceleration sensor 1 and to an analogue gate 3 which kills noise, a disturbance wave, among output signals of the frequency filter 2 when knocking is detected, both being arranged in this order. Switching of the analogue gate 3 is controlled by a gate timing controller 4. An ignition signal being outputted by a phase shifter 8 is inputted to the gate timing controller 4. This ignition signal should generate ignition noise. According to a a timing to generate the ignition noise, a gate of the analogue gate 3 is closed for a predetermined period of time. A voltage signal from the analogue gate 3 is outputted both to a comparator 6 and to a noise level detector 5. The noise level detector 5 outputs slightly higher DC voltage than this voltage signal to the comparator 6. And the comparator 6 compares the output voltage from the analogue gate 3 to that from the noise level detector 5 so as to obtain its equation signal, that is, a knocking detection pulse, and then outputs it to an integrator 7. The integrator 7, then, integrates this output pulse, and outputs the integrated voltage corresponding to the strength of knocking to the phase shifter 8.

Reference numeral 9 designates a rotation signal generator, which generates an ignition signal corresponding to ignition lead angle characteristics of the internal combustion engine 13 in synchronism with its rotation, and outputs this ignition signal to a waveform shaping circuit 10. The waveform shaping circuit 10 changes the output signal from the rotation signal generator 9 into a keying pulses with a required closed angle, and outputs this as a reference ignition signal to the phase shifter 8. The phase shifter 8 shifts the phase of this reference ignition signal corresponding to the output voltage from the integrator 7, and outputs the keying pulse after the shift as an ignition signal both to the gate timing controller 4 and to a switching circuit 11. The switching circuit 11 controls an intermittent electric supply to an ignition coil 12 in response to the ignition signal from the phase shifter 8. In response to the ignition voltage of this ignition coil 12, the internal combustion engine 13 is ignited and run.

Now, functional operation of the prior art apparatus will be described below with reference to waveforms of output signals in each portion of FIG. 1.

Figure 2:
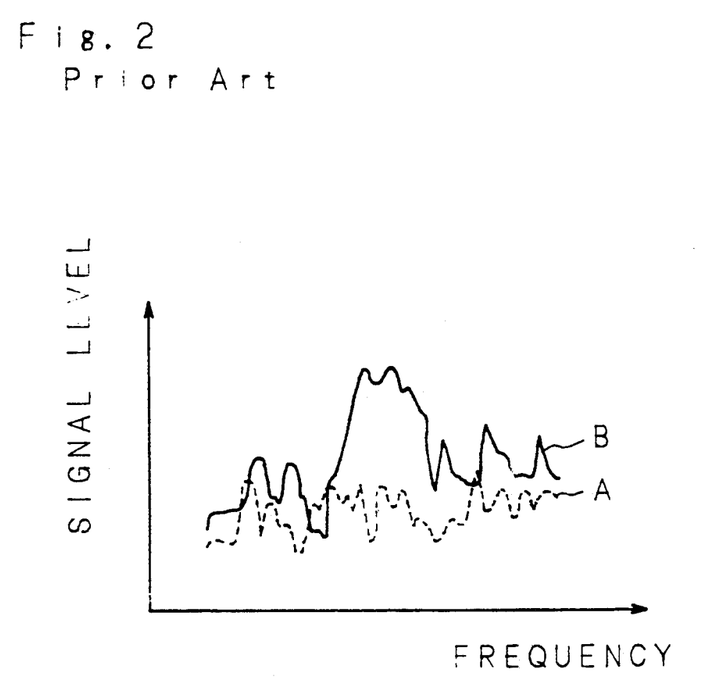
FIG. 2 is a graph showing output characteristics of an acceleration sensor, FIGS. 3(a), (b), (c), (d), (e), (f), (g), and (h) are graphs showing operating waveforms of each portion in FIG. 1 when there is generated no knocking, FIGS. 4(a), (b), (c), (d), (e), (f), (g), and (h) are graphs showing operating waveforms of each portion in FIG. 1 when there is generated knocking.

FIG. 2 is a graph showing frequency characteristics of an output signal of the acceleration sensor 1, in which reference character A designates the case where there is generated no knocking of the internal combustion engine 13, so does B the case where there is generated knocking. The output signal of the acceleration sensor 1 includes a knock signal (signal being generated when knocking occurs), mechanical noise in the internal combustion engine, and such noise being caused in a signal path as ignition noise. In comparison with A to B in FIG. 2, distributions are apparently different whether there is generated knocking or not, and it can be seen that the knock signal has its own frequency characteristics. The frequency filter 2 passes only this frequency element indigenous to the knock signal, then, noise being caused by the other frequency element can be avoided and the knock signal can be effective detected.

FIGS. 3 and 4 show operating waveforms in each portion in FIG. 1, those alphabets named identically in those both figures show waveforms of the same portions. FIG. 3 shows the case where there is not generated any knocking of the internal combustion engine 13, and so does FIG. 4 the case where there is.

Figure 3A:
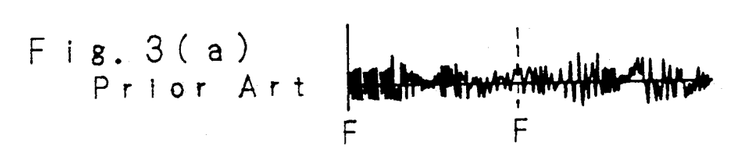
Figure 3B:
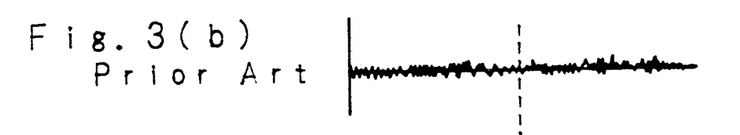
Figure 3C:
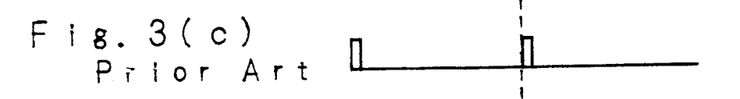

Now will be described below functional operation in the case where there is not generated any knocking with reference to FIG. 3. FIG. 3(a) shows the outputs signal of the acceleration sensor 1. This output signal does not include the knock signal when knocking occurs but does other mechanical noise or ignition noise being generatede at an ignition timing F of the internal combustion engine 13. FIG. 3(b) shows an output signal of the frequency filter 2. The output signal from the acceleration sensor 1 passes through the frequency filter 2, then, the mechanical noise is substantially eliminated. On the other hand, the level of the ignition noise is so high that the ignition noise should be outputted at its high lever even after it passes through the frequency filter 2, then, this ignition noise may be mistaken for the knock signal. In signal to an output signal of the gate timing controller 4 (FIG. 3(c)) which is triggered in response to the output signal (ignition signal) from the phase shifter 8, the gate of the analogue gate 3 is closed for a predetermined period of time after the ignition timing F, and during this predetermined period of time, signals from the frequency filter 2 will not pass through the analogue gate 3. As a result, the voltage signal from the analogue gate 3 (shown by C in FIG. 3(d)) includes no ignition noise but has mechanical noise of low level alone. And such a voltage signal as shown by C in FIG. 3(d) is outputted both to the comparator 6 and to the noise level detector 5.

Figure 3D:
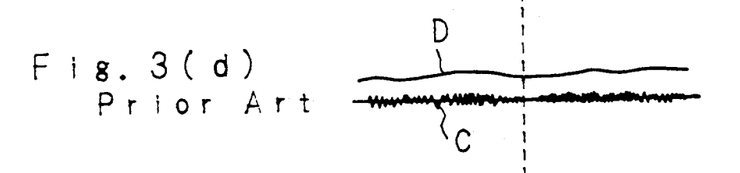
Figure 3E:
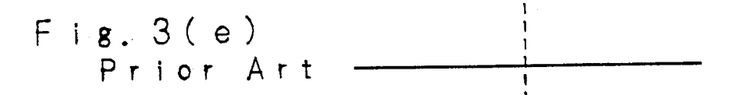
Figure 3F:
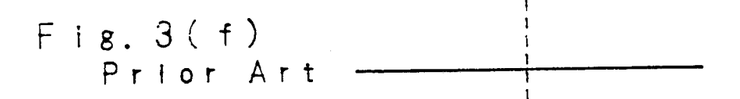
Figure 3G:
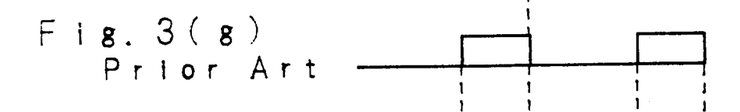
Figure 3H:
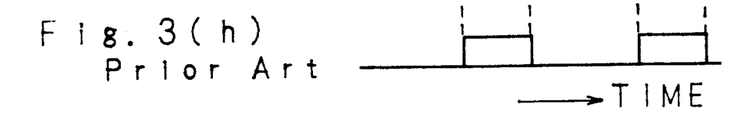

In the noise level detector 5, there is generated slightly higher DC voltage (shown by in D in FIG. 3(d)) than an envelope level of the mechanical noise. FIG. 3(e) and (f) show output signals of the comparator 6 and the integrator 7, respectively. There being no knock signal, an output D from the noise level detector 5 is always larger than the output from the analogue gate 3, and the output signal from the comparator 6 is always 0, and so is the output voltage from the integrator 7. FIG. 3(g) and (h) show an output signal of the waveform shaping circuit 10 (reference ignition signal) and that of the phase shifter 8 (ignition signal), respectively. The output voltage from the integrator 7 being always 0, the phase shifter 8 will not shift the phase, then, the ignition signal has the same phase as the reference ignition signal.

Next will be described functional operation of the prior art apparatus in the case where there is generated knocking.

Figure 4A:
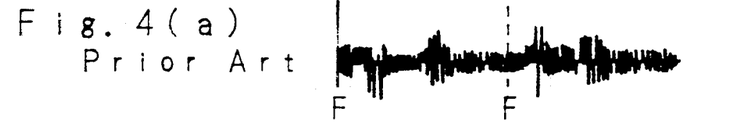
Figure 4B:
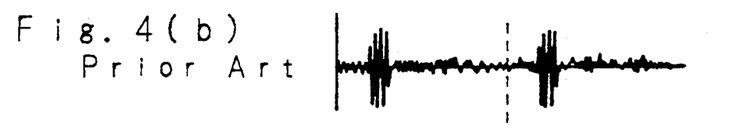
Figure 4C:
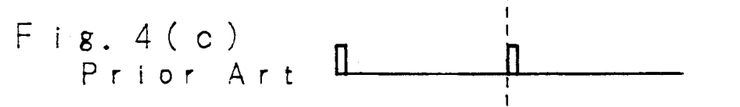
Figure 4D:
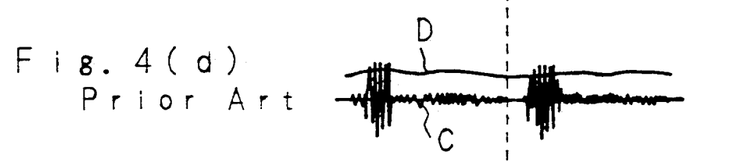
Figure 4E:
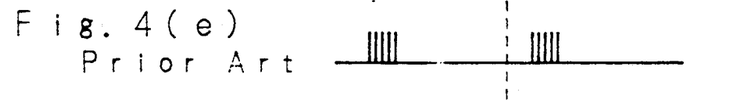

The output signal of the acceleration sensor 1 includes the knock signal at the point of a time lagged for a predetermined time after the ignition timing as shown in FIG. 4(a), then, the signal which has passed through both of the frequency filter 2 and the analogue gate 3 is the one shown by C in FIG. 4(d), in which the knock signal is largely overlapped with the mechanical noise. Among those signals which have passed through the analogue gate 3, rising of the knock signal is so steep that the level of an output voltage D of the noise level detector 5 does not react to the knock signal. As a result, inputs of the comparator 6 are shown as C and D in FIG. 4(d), then, there is generated a pulse in the output of the comparator 6 as shown in FIG. 4(e).

Figure 4F:
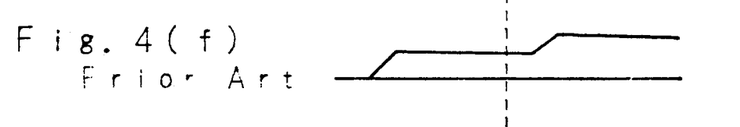
Figure 4G:
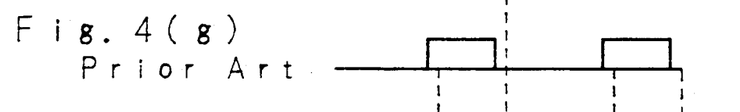
Figure 4H:
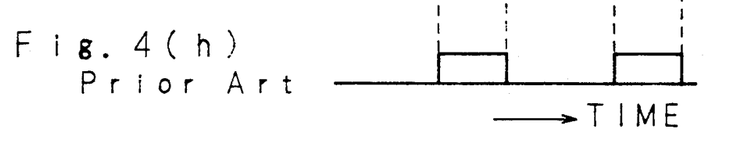

The integrator 7 integrates the pulse and generates an integrated voltage as shown in FIG. 4(f). Corresponding to the output voltage of the integrator 7, the phase shifter 8 shifts the output signal of waveform shaping circuit 10 (FIG. 4(g) (reference ignition signal)) to the side of the lag time, then, the phase of the output signal of the phase shifter 8 (ignition signal) lags behind the phase of the reference ignition signal and the switching circuit 11 is driven by the keying pulse (ignition signal) shown in FIG. 4(h). As result, the ignition timing lags and knocking is avoided.

As may be seen from the above description, operations in those states in FIGS. 3 and 4 are repeated to perform the most advantageous ignition timing control.

Figure 5:
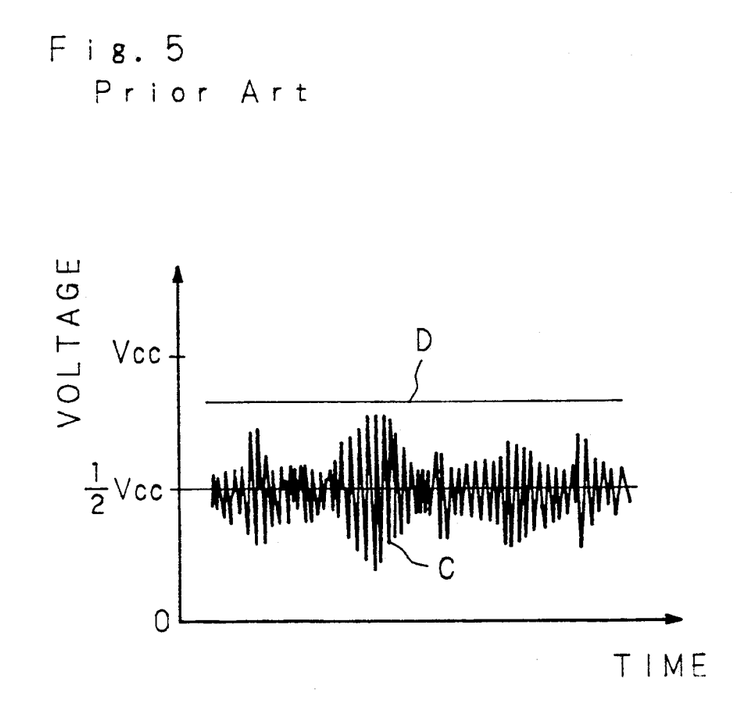
FIG. 5 is a graph showing a relationship between a circuit power voltage and a bias voltage.

In the above-mentioned knocking detection circuit, such an acceleration signal being detected by the acceleration sensor 1 as shown in FIGS. 3 and 4 is handled in the frequency filter 2, the analogue gate 3, the noise level detector 5, and the comparator 6. As shown in (b)s and Cs of (d)s in FIGS. 3 and 4, in order to process the acceleration signal (AC signal), each of above those units sets an average value of each signal to be a predetermined bias so that the acceleration signal can be properly processed without having any distortion in either of positive and negative waveforms. This state is shown in a graph of FIG. 5, in which a bias voltage is set to be the point of ½ Vcc in a circuit power voltage (Vcc) being supplied from a power circuit (not shown in FIG. 1). In the figure, reference character C designates the output voltage of the analogue gate 3 (signal corresponding to C in FIG. 3(d) or C in FIG. 4(d)), so does D an output voltage of the noise level detector 5 (signal corresponding to D in FIG. 3(d) or D in FIG. 4(d)). Signals of both of those output voltages are processed on the basis of the bias voltage (½ Vcc), then, both of positive and negative waves of the signal C in FIG. 5 are properly processed without having any distortion.

When there are conditions that the circuit power voltage (Vcc)=8V, the power circuit is arranged by a serial regulator system, and the minimum voltage loss of the power circuit is 0.5 V, the power circuit is stabilized to supply the circuit power voltage (Vcc) when a battery voltage is more than 8.5 V. On the other hand, when the battery voltage becomes less than 8.5V, the circuit power voltage (Vcc) becomes not a specified voltage but a lower and unstable value. In that case, signals in each portion are so turbulent that a signal to be mistaken for a knock signal should be outputted.

Recently, there has been many cases that the internal combustion engine is electrically controlled and that the above-mentioned knocking detection circuit is integrated into the control apparatus for controlling fuel supply to the internal combustion engine.

Figure 6:
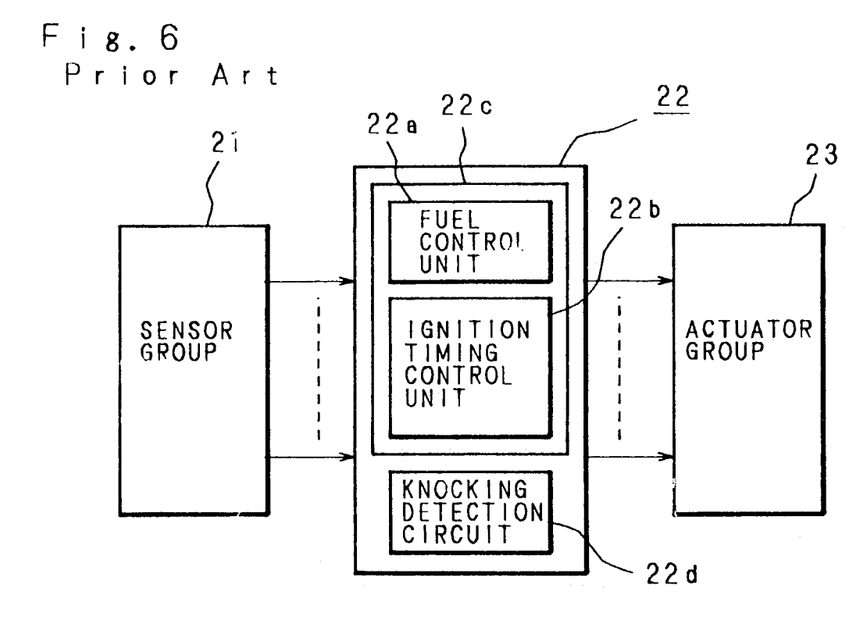
FIG. 6 is a block diagram of the prior art control apparatus for internal combustion engine.

Such a prior art control apparatus will be described with reference to FIG. 6. In the figure, reference numeral 21 designates a sensor group, which is comprised of such sensors for measuring or detecting various types of information required for the fuel control and ignition timing control as an flow meter for measuring air flow being inhaled in each cylinder of an engine, crank angle sensor for generating various types of reference signals in synchronism with rotation of a crank shaft, a temperature sensor for measuring the cooling water temperature, and an acceleration sensor for detecting an acceleration signal. The various types of running information being obtained in the sensor group 21 is transmitted to a control unit 22. The control unit 22 is comprised of a microcomputer 22c which is provided with a fuel control unit 22a for controlling fuel supply to the internal combustion engine and an ignition timing control unit 22b for controlling an ignition timing, and a knocking detection circuit 22d of such an arrangement as shown in FIG. 1. The driving signal from the control unit 22 is outputted to an actuator group 23. The actuator group 23 is comprised of various types of such actuators for the fuel control in the engine and for ignition timing control as an injector for supplying fuel, an ingition control for generating an ignition voltage, an air valve for controlling fast idle, and a waste gate for controlling a turbo supercharging pressure.

Now will be described below functional operation of those above-mentioned units. According to the running information from these various types of sensors in the sensor group 21, the control unit 22 operates to obtain driving parameters of the fuel supply and ignition timing in the fuel control unit 22a and the ignition timing control unit 22b, respectively and drives those various types of actuators in the actuator group 23 so that predetermined running states for the control can be obtained. Knocking being generated in the internal combustion engine is detected in the knocking detection circuit 22d by the output from the acceleration sensor in the sensor group 21, and corresponding to the result of the detected knocking, the ignition timing control unit 22b operates to obtain the ignition timing.

The microcomputer 23c is actuated with the circuit power voltage (Vcc)=5 V. If there are conditions that a power circuit (not shown) for supplying the circuit power voltage (Vcc) is arranged by the serial regulators system and that the minimum voltage loss of the power circuit is 0.5 V, the power circuit is stabilized to supply the circuit power voltage (Vcc)=5V when the battery voltage is more than 5.5 V. And the knocking detection circuit 22d, as mentioned above, is stabilized to be actuated when the battery voltage is more than 5.5V. Generally, the battery voltage when the internal combustion engine is on the start-up is about 6V because a starter is actuated. And in that case, the microcomputer 23c is stably actuated, but the knocking detection circuit 22d could not stably be actuated.

Figure 7:
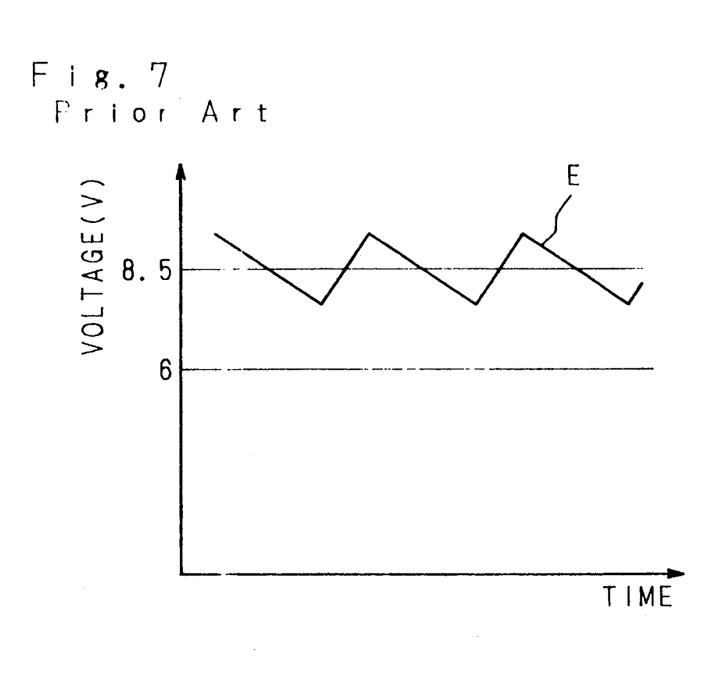
FIG. 7 is a graph showing a relationship between a battery voltage and the circuit power voltage.

As a result, when the battery voltage has a value varying from more than 6V to less than 8V, the microcomputer 23c is normally actuated, but the knocking detection circuit 22d is not normally actuated. Then, there is a disadvantage that a wrong knock signal should be outputted from the knocking detection circuit 22d and, in response to this signal, the microcomputer 23c should perform its wrong control. Especially when a battery voltage E is varied with ripples as shown in FIG. 7, there is high possibility that the knock signal should be detected by mistake.

SUMMARY OF THE INVENTION

The foregoing disadvantage is overcome in accordance with the present invention. The control apparatus for internal combustion engine of the present invention is provided with a microcomputer for running control of the internal combustion engine, a signal processing circuit with higher operating voltage than that of the microcomputer, and control means for invalidating an output of the signal processing circuit of lowering the control level based upon this output when a voltage of the signal processing circuit becomes less than a predetermined value.

In such a control apparatus as mentioned above, for example, the knocking detection circuit corresponds to the signal processing circuit, and when the voltage of this signal processing circuit is less than the predetermined voltage, the apparatus is adaopted not to be affected by a wrong knock signal being outputted from the knocking detection circuit by invalidating the knock signal from the knocking detection circuit or by lowering the control level based upon this knock signal.

As a method of detecting the voltage in the signal processing circuit, it may be advantageous to detect a battery voltage of a power source which supplies voltage both to the microcomputer and the signal processing circuit, or to directly detect the circuit voltage in the signal processing circuit.

It is an object of the present invention to provide a control appratus for internal combustion engine which is not liable to have any trouble in its control operation even if the voltage of the signal processing circuit becomes a predetermined low value and a wrong signal should be outputted.

It is another object of the present invention to provide a control apparatus for internal combustion engine in which driving control of the internal combustion engine is not liable to be affected by the wrong signal if the microcomputer for running control of the internal combustion engine is provided with the knocking detection circuit as a signal processing circuit.

The above and further objects and features of the invention will more fully be apparent from the following detailed description with accompanying drawings.

DESCRIPTION OF THE PREFERRED EMBODIMENTS

Figure 8:
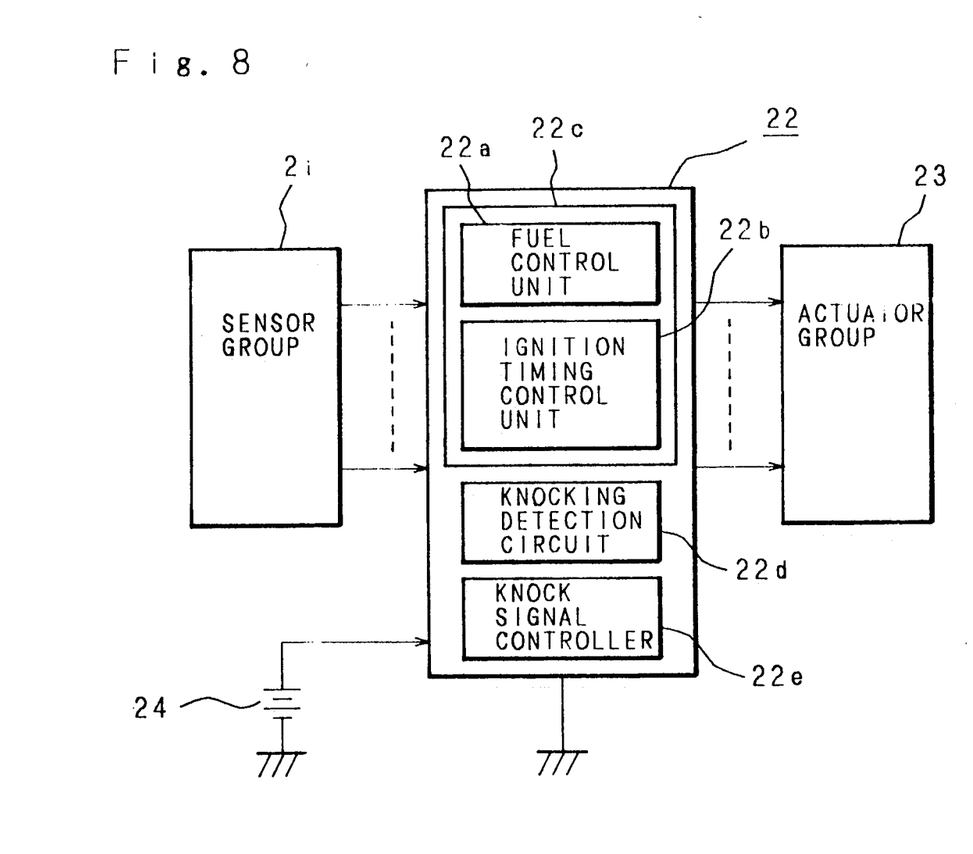
FIG. 8 is a block diagram of a control apparatus for internal combustion engine of the present invention.

FIG. 8 is a block diagram showing a control apparatus for internal combustion engine of one embodiment of the present invention. In the figure, a sensor group 21, a microcomputer 22c being comprised of a fuel control unit 22a and an ignition timing control unit 22b, a knocking detection circuit 22d as a signal processing circuit, and an actuator group 23 perform the same functions as those identically numbered in the prior art apparatus shown in FIG. 4. A control unit 22 is provided with a knock signal controller 22e which detects the operating state of the knocking detection circuit 22d and which controls a knock signal, in addition to the microcomputer 22c and the knocking detection circuit 22d.

The microcomputer 22c (fuel control unit 22a and ignition timing control unit 22b) and the knocking detection circuit 22d are actuated by a power supply from a battery 24. A power circuit (not shown) which supplies a voltage to the microcomputer 22c is supplied voltage from the battery 24. The knocking detection circuit 22d has its exclusive power circuit (not shown), which is also supplied voltage from the battery 24.

Figure 9:
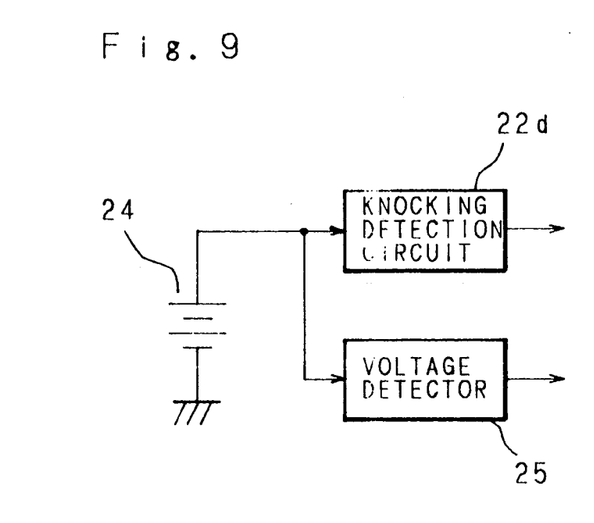
FIG. 9 is a block diagram of one example of a knock signal controller.

One embodiment of the knock signal controller 22e is shown in FIG. 9. In the figure, reference numberal 25 designates a voltage detector, which is provided in the knock signal controller 22e and which detects a battery voltage being inputted from the battery 24 to the control unit 22 (knocking detection circuit 22d), and which outputs a control signal to the ignition timing control unit 22b when the detected value is lower than 8.5 V.

Now will be described below functional operation of the apparatus of the invention. Basic operations of the fuel control and ignition timing control in the sensor group 21, microcomputer 22c, knocking detection circuit 22d, and actuator group 23 are the same in such a prior art apparatus as shown in FIG. 4, those will be omitted here.

When there is 8.5 V of battery voltage or more, the microcomputer 22c and knocking detection circuit 22d are stably actuated. Accordingly, when the voltage detector 25 detects a value of 8.5 V or more, the knock signal controller 22e will not output the control signal. As a result, the basic operations for the fuel control and ignition timing control can stably be carried out.

On the other hand, when there is less than 8.5 V of battery voltage, the knocking detection circuit 22d is unstably operated because of the speed and the magnitude of ripples of the battery voltage. Then, when the detected value by the voltage detector 25 is less than 8.5 V, the knock signal controller 22e outputs a control signal to the ignition timing control unit 23b. Receiving the control signal from the knock signal controller 22e, the ignition timing control unit 23b, if a knock signal should be transmitted from the knocking detection circuit 22d, identifies this knock signal to be a wrong knock signal and does not use this for the controls.

Figure 11:
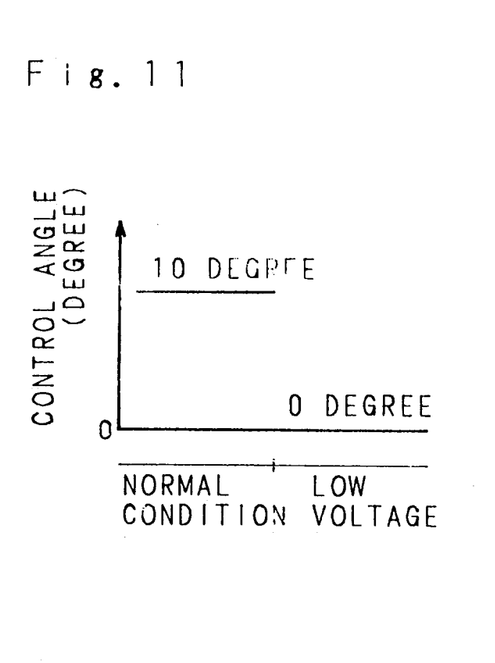
FIG. 11 is a graph showing one characteristic of a control angle in the control apparatus for internal combustion engine of the present invention.

FIG. 11 shows a control angle of ignition timing control unit 23b which is based upon the output from the knocking detection circuit 22d. In the normal state when the battery voltage is 8.5 V or more, the control angle has the width of 10 degree, and when it is less than that, the output signal (knock signal) from the knocking detection circuit 22d is invalidated and the control angle is made to have the width of 0 degree without performing any control. With such an arrangement as mentioned above, if a wrong knock signal should be transmitted from the knocking detection circuit 22d, this signal could completely be ignored and no trouble would affect the controls.

Figure 10:
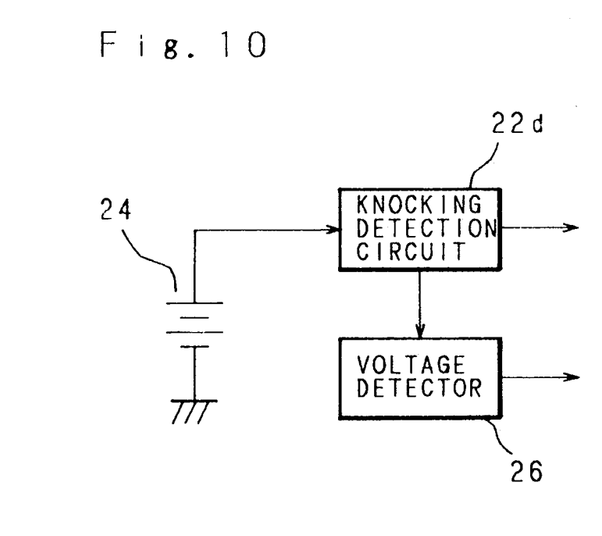
FIG. 10 is a block diagram of another example of the knock signal controller.

Another embodiment of the knock signal controller 22e is shown in FIG. 10. In the figure, reference numeral 26 designates a voltage detector, which is provided in the knock signal controller 22e and which detects a voltage in the knocking detection circuit 22d. When the voltage detector 26 detects that reduction of the battery voltage from the battery 24 makes the voltage in the knocking detection circuit 22d too low to detect a regular knock signal, it outputs a control signal to the ignition timing control unit 22b.

Figure 12:
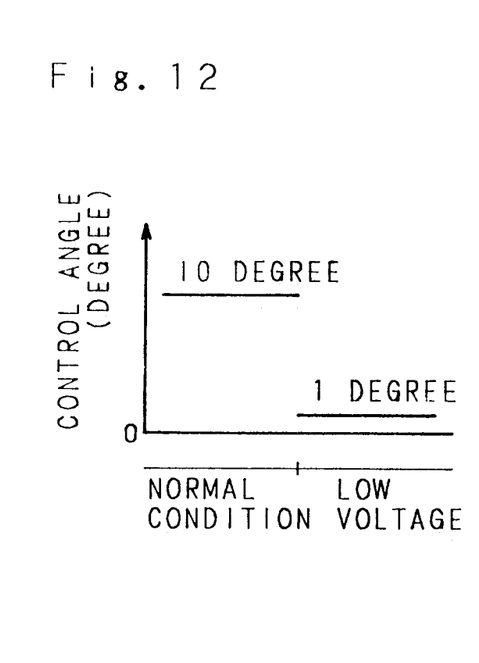
FIG. 12 is a graph showing another characteristic of the control angle in the control apparatus for internal combustion engine of the present invention.

Another embodiment of the control angle of ignition timing control unit 22b when the voltage is low is shown in FIG. 12. In the normal state when the battery voltage is 8.5 V or more, the control angle has the width of 10 degree, and when it is less than that, the control angle has the width of just 1 degree. As a result, in the case where the battery voltage is so low that the knocking detection circuit 22d can not detect the regular knock signal or it should output a wrong knock signal, there is possibility that the maximum 1 degree of control is performed because the ignition timing control unit 22b has the width of just 1 degree, however, which angle is too small to induce some trouble in the normal controls.

As can be seen from the above description, when the battery voltage is too reduced to ensure the operating voltage of the knocking detection circuit 22d, which should output a wrong knock signal, this wrong knock signal will be ignored or the control level in response to this wrong knock signal is extremely small. This, then, leads no trouble for the ignition timing control even in that case.

Especially when the internal combustion engine has its so low rotation that a generator thereof has a low capacity (when idling running, for example), the battery voltage is readily reduced according to change of its current load, then, the present invention is advantageous in order to avoid it.

In addition to it, when the internal combustion engine is driven with a light load, output of the internal combustion engine is so small that the internal combustion engine readily stalls because of change of the ignition timing, then, the present invention is also advantageous in this case.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A control apparatus for an internal combustion engine having a microcomputer for running control of the internal combustion engine according to running information of the internal combustion engine and a signal obtained by processing said running information, comprising:
   a signal processing circuit which has a higher operating voltage than that of said microcomputer and which supplies said signal to said microcomputer; and
   control level change means for lowering the control level in response to an output of said signal processing circuit when the voltage of said signal processing circuit is lower than a predetermined value, wherein said signal processing circuit is a circuit for detecting knocking of the internal combustion engine.

2. A control apparatus for an internal combustion engine as set forth in claim 1, wherein said microcomputer controls fuel supply to the internal combustion engine and ignition timing of the internal combustion engine.

3. A control apparatus for an internal combustion engine as set forth in claim 1, wherein said control level change means is provided with a voltage detector for detecting a voltage in said signal processing circuit.

4. A control apparatus for an internal combustion engine as set forth in claim 1, wherein said microcomputer and said signal processing circuit are supplied voltage from the same power source, and said control level change means is provided with a voltage detector for detecting voltage of said power source.

* * * * *